(12) United States Patent
Robins

(10) Patent No.: US 6,357,696 B1
(45) Date of Patent: Mar. 19, 2002

(54) SYSTEM AND METHOD FOR THE CONTROLLED ILLUMINATION OF AT LEAST ONE HOT AIR BALLOON

(76) Inventor: Thomas S. Robins, 2 Kingwood Ave., Frenchtown, NJ (US) 08825

( * ) Notice: Subject to any disclaimer, the term of this patent is extended or adjusted under 35 U.S.C. 154(b) by 0 days.

(21) Appl. No.: 09/777,768

(22) Filed: Feb. 6, 2001

(51) Int. Cl.[7] ................................................. B64B 1/40
(52) U.S. Cl. ........................ 244/31; 244/33; 116/28 R
(58) Field of Search ............................ 244/24, 31, 33, 244/1 R; 116/DIG. 9, 1, 28 R

(56) References Cited

U.S. PATENT DOCUMENTS

| | | | |
|---|---|---|---|
| 4,332,547 A | 6/1982 | MacDonald, Jr. ............ 431/242 |
| 5,149,015 A | 9/1992 | Davis ........................... 244/31 |
| 5,567,142 A | 10/1996 | Purdy ........................... 431/18 |
| 5,857,760 A | * 1/1999 | Pelton ........................... 362/32 |

* cited by examiner

Primary Examiner—J. Woodrow Eldred
(74) Attorney, Agent, or Firm—LaMorte / Asociates

(57) ABSTRACT

A system and method for illuminating hot air balloons is claimed. The system includes a activating a burner assembly on multiple hot air balloons from a central location. As the burner assemblies are activated, the hot air balloons become illuminated. Consequently, the illumination of multiple hot air balloons can be synchronized and otherwise choreographed from a single control station.

20 Claims, 3 Drawing Sheets

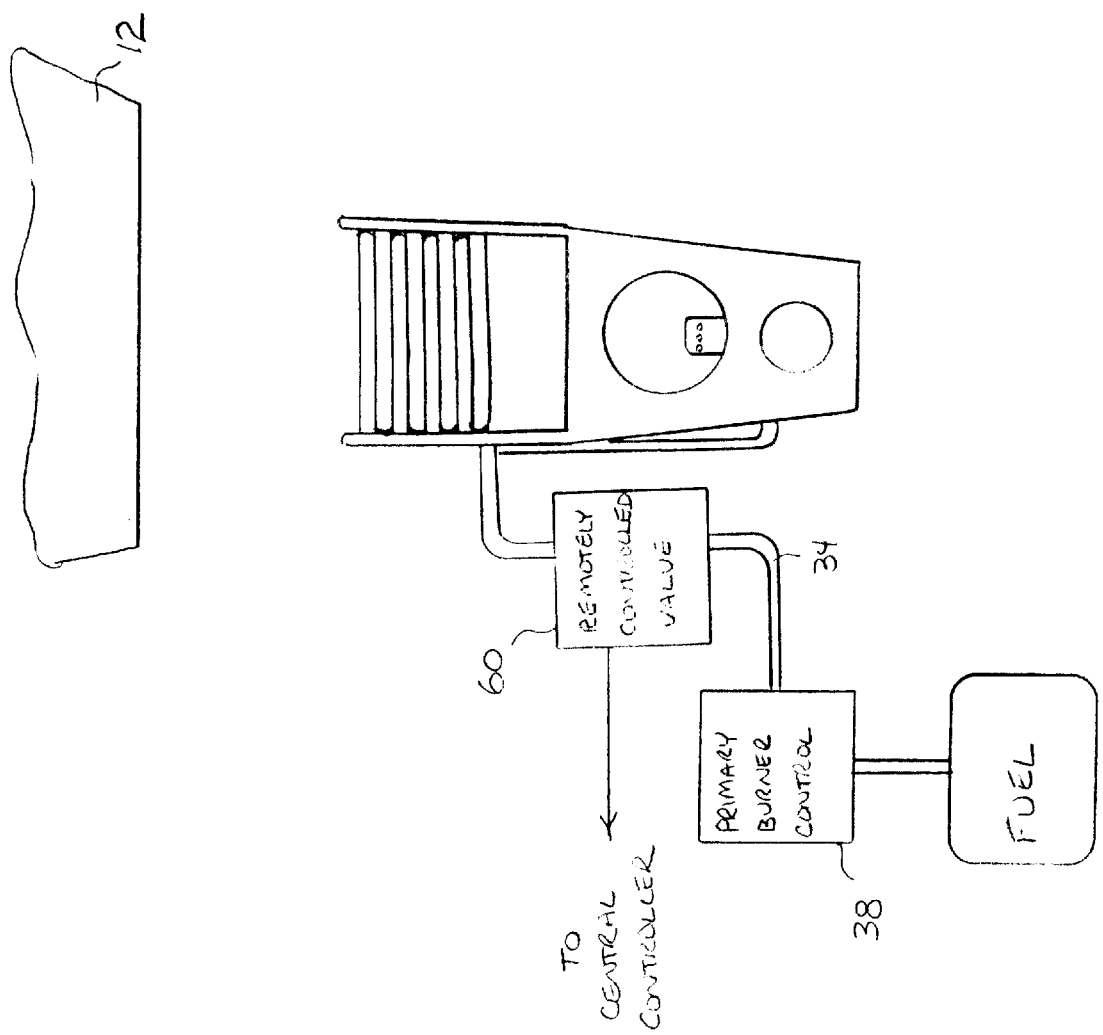

SYSTEM AND METHOD FOR THE CONTROLLED ILLUMINATION OF AT LEAST ONE HOT AIR BALLOON

BACKGROUND OF THE INVENTION

1. Field of the Invention

The present invention relates to hot air balloons and the burner systems for hot air balloons. More particularly, the present invention relates to the structure of hot air balloon burner systems and the controls to operate hot air balloon burner systems.

2. Description of the Prior Art

Hot air balloons have been in existence for hundreds of years. Hot air balloons utilize balloons that are filled with hot air. As the air in the balloon is heated, air in the balloon becomes less dense than the air surrounding the balloon and lift is created. By connecting a passenger basket to the balloon, the lift from the balloon can be used to lift the passenger basket and its occupants into the air.

Early hot air balloons used fires on the ground to heat the air in the balloon. However, a modern hot air balloon carries fuel and burners, so that the air in the balloon can be selectively and repeatedly heated during flight. In this manner, the lift created by the hot air in the balloon can be controlled in a much more precise manner.

In a modern passenger hot air balloon, the balloon itself is made of a strong, light weight synthetic material. Below the balloon is tethered a passenger basket. Between the passenger basket and the bottom of the balloon is located a burner assembly. The burner assembly is coupled to a fuel source, usually propane, that is coupled to the exterior of the passenger basket. The pilot in the balloon controls the burner assembly by using the burner assembly to produce a flame for a desired duration. When the pilot activates the burner assembly, fuel is ignited and the burning fuel is directed upwardly into the balloon. The burning fuel increases the temperature of the air in the balloon, thus controlling the lift provided by the balloon.

The material used in the manufacture of a modern balloon is so thin that, at night, the burning of the fuel into the balloon can be seen through the material of the balloon. As such, as fuel is burned within the balloon, the balloon becomes internally illuminated.

The internal illumination of large hot air balloons is aesthetically pleasing because it makes the balloon glow internally and become highly visible at night. It is for this reason that during some hot air balloon rallies, balloons are tethered to the ground at night. The balloons are then purposely illuminated with their burners for no other reason than to make the balloons visible. Often multiple balloons are tethered to the ground side-by-side and the balloons are illuminated sequentially. The lighting of the balloons is often attempted to be choreographed to music that is broadcast to spectators observing the hot air balloons.

In the prior art, a pilot illuminates his/her balloon by igniting the primary burner assembly in a short burst. Primary hot air balloon burners are designed to heat the air in the balloon as efficiently as possible. The primary burners are not designed to produce as bright a flame as possible. As a result, when a pilot illuminates his/her balloon he/she wastes a great amount of expensive fuel trying to achieve a high degree of illumination. Additionally, the lift provided by the balloon changes as the air in the balloon heats up from the attempts at illumination. If a pilot is trying to illuminate his/her balloon in synchronization with a piece of music, the pilot of the balloon must listen to the broadcast music and time the activation of the burner assembly to illuminate the balloon at the right times. This is not an easy feat and many times the attempts to illuminate a hot air balloon falls out of synchronization with the broadcast music. The more hot air balloons that are to be illuminated, the greater the degree of error and the more likely it is that the illuminating of the balloons will fall out of synchronization with the corresponding music.

A need therefore exists for a way to better illuminate a balloon without wasting excess fuel. A need also exists for a better system to control the illumination of a hot air balloon so that the illumination of the balloon can be better choreographed to music. These needs are met by the present invention as it is described and claimed below.

SUMMARY OF THE INVENTION

The present invention is a system and method for illuminating hot air balloons. The In a first embodiment, the system includes a secondary burner assembly that mounts to the primary burner assemblies within each of the hot air balloons. The secondary burner assemblies are designed to produce highly visible and luminescent flames that internally illuminate the hot air balloon without wasting large amounts of fuel. The secondary burner assemblies are installed in a plurality of hot air balloons. The hot air balloons can either be tethered to the ground or in flight. Each of the secondary burner assemblies is controlled by a single central controller. The central controller is located in one of the hot air balloons or at a point remote to all the hot air balloons.

The central controller can activate the various secondary burner assemblies in a predetermined sequence. Alternatively, the central controller can utilize a user interface so that a person can selectively control the activation of the various secondary burner assemblies through the central controller.

In a secondary embodiment, a secondary burner assembly is not used. Rather, a central controller is coupled to the existing primary burner assembly of the balloon and the primary burner assembly is ignited in a synchronized manner from the location of the central controller.

BRIEF DESCRIPTION OF THE DRAWINGS

For a better understanding of the present invention, reference is made to the following description of exemplary embodiments thereof, considered in conjunction with the accompanying drawings, in which:

FIG. 3 is a schematic view of an alternate embodiment of a burner control system in accordance with the present invention.

DETAILED DESCRIPTION OF THE INVENTION

Figure 1:
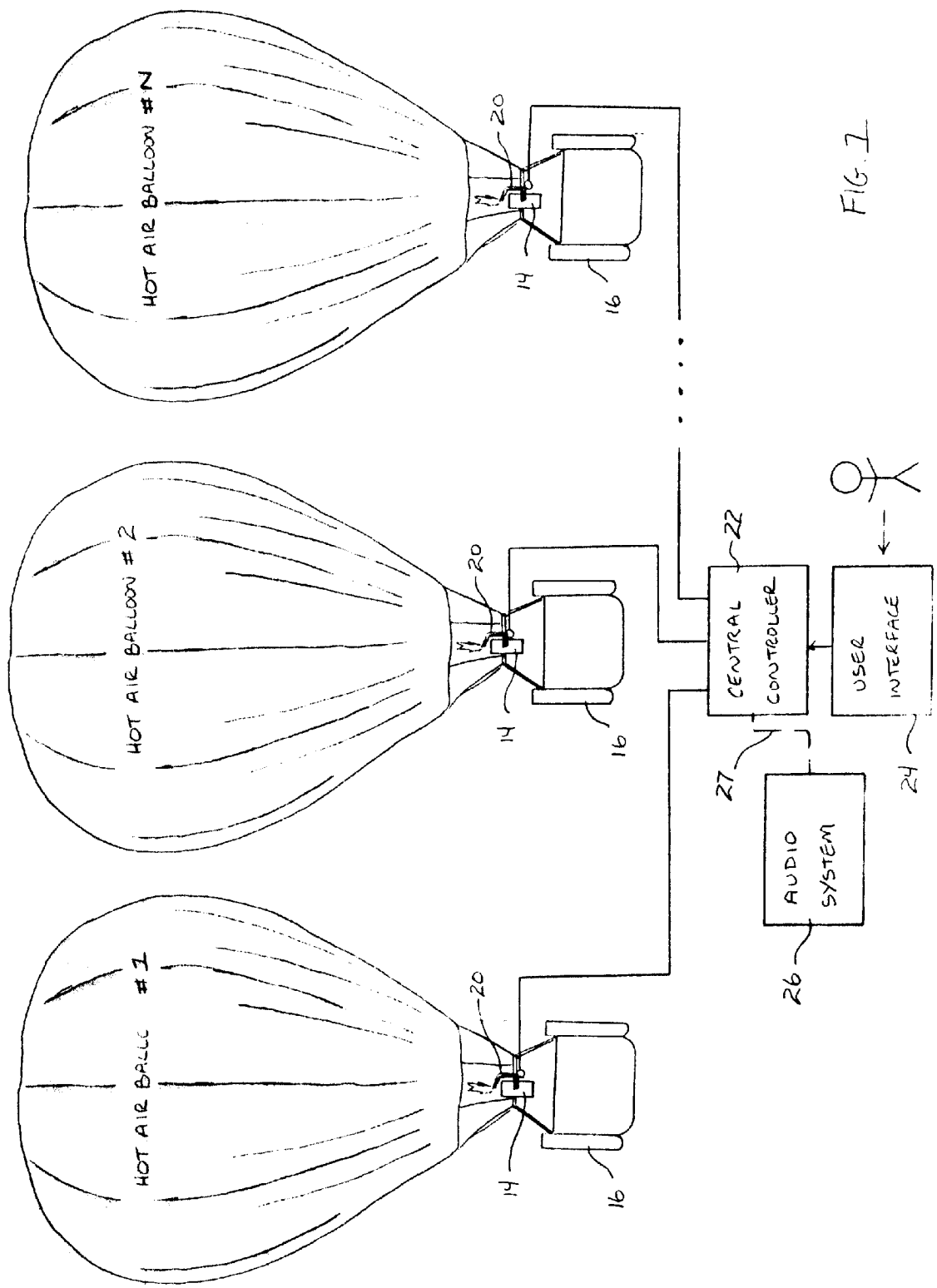
FIG. 1 is schematic view of the present invention system as it is used to selectively illuminate a plurality of hot air balloons.

Referring to FIG. 1, an exemplary schematic of a hot air balloon illumination system 10 is shown. In the shown schematic, the system 10 is being used to coordinate the illumination of a plurality of hot air balloons 12. However, it will be understood that the present invention system 10 can be used to illuminate a single hot air balloon as well as any plurality of hot air balloons.

In FIG. 1, a plurality of hot air balloons 12 are shown. Each of the hot air balloons 12 contains a primary burner assembly 14 and a source of fuel 16 for supplying the primary burner assembly 14. However, what is new to each hot air balloon 12 is the installation of an additional illumination burner assembly 20. As will later be explained in detail, the illumination burner assembly 20 contains a small burner nozzle that is designed to produce the very brightest flame using a minimal amount of fuel gas. The illumination burner assembly 20 is not designed to heat the air in the balloon 12. Rather, the illumination burner assembly 20 is designed to internally illuminate the space defined by each hot air balloon 12 using only small amounts of fuel gas.

The illumination burner assembly 20 is coupled to the same source of gas fuel 16 as is the primary burner assembly 14. However, due to the design of the illumination burner assembly 20, the illumination burner assembly 20 can illuminate a hot air balloon 12 much brighter than the primary burner assembly 14 using only a fraction of the gas fuel 16 that the primary burner assembly 14 would use for the same length burn.

The illumination burner assembly 20 in each of the hot air balloons 12 is linked to a single central controller 22. The link between the illumination burner assembly 20 and the central controller 22 can be a hard wire interconnection or a remote interconnection, such as a radio signal interconnection or a microwave cellular interconnection. As such, it is the central controller 22 that controls the operation of all the illumination burner assemblies 20, not the individual pilots within the actual hot air balloons 12.

A user interface 24 is coupled to the central controller 22. The user interface 24 is the device through which a person instructs the central controller 22 on when to activate and deactivate the various illumination burner assemblies 20. The user interface can be a computer key board, a bank of switches, a bank of buttons, an instrument key board or any other such arrangement that enables a user to selectively activate any specific illumination burner assembly 20 with the touch of a finger.

The present invention system 10 is particularly well suited for illuminating multiple hot air balloons 12 in synchronization with a selective piece of music. Music is broadcast to people observing the hot air balloons 12 using an audio system 26. The music broadcast by the audio system 26 is also heard by the person at the user interface 24 of the central controller 22. As a person hears the music being broadcast, that person can selectively utilize the user interface 24 to cause the illumination burner assemblies 20 to light in synchronization with the music.

In an alternate embodiment, the need for a person with musical talent to operate the central controller 22 can be illuminated. The central controller 22 can be directly connected to the audio system, as is indicated by line 27. In such a scenario, the central controller 22 controls when music is broadcast to spectators through the audio system 26. Since the central controller 22 controls the broadcast of the music, the central controller 22 can be preprogrammed with an illumination pattern that corresponds in time to the music that is to be played. The central controller 22 starts the broadcast music and the preprogrammed illumination pattern at the same time. The preprogrammed illumination pattern lights the various illumination burner assemblies 20 in timed synchronization with the broadcast music.

Figure 2:
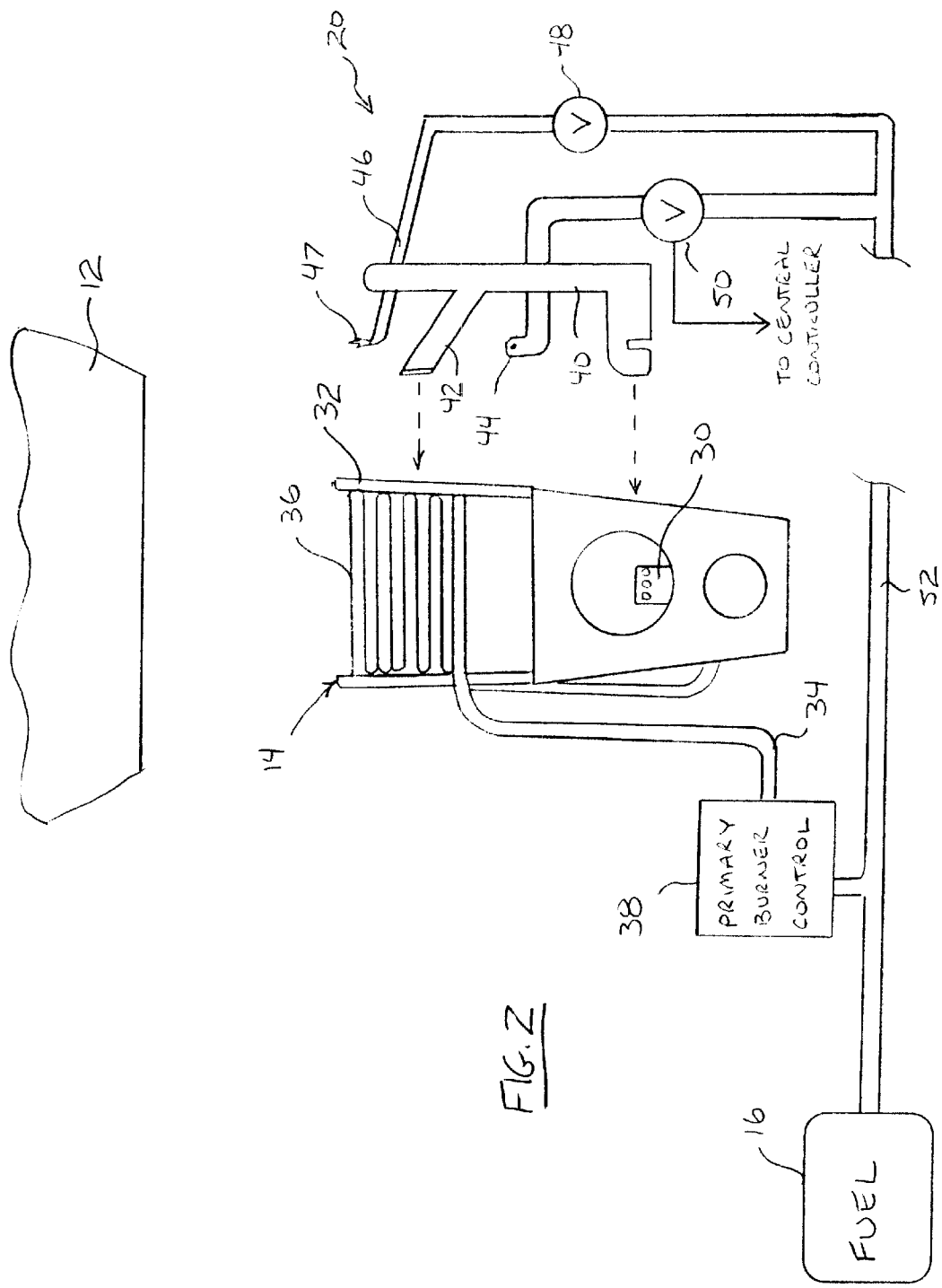
FIG. 2 is a schematic view of an exemplary embodiment of a secondary burner assembly shown in conjunction with the primary burner assembly of a hot air balloon.

Referring to FIG. 2, a conventional primary burner assembly 14 for a hot air balloon 12 is shown. The primary burner assembly 14 is used to heat the air in the hot air balloon 12. The primary burner assembly 14 contains the main burner nozzles 30. The main burner nozzles 30 are mounted in a frame structure 32 that can be manipulated by the pilot of the hot air balloon 12. In this manner, the pilot can selectively direct the burning gas released by the main burner nozzles 30 into the balloon. This is particularly useful when a pilot is first filling a deflated balloon.

The fuel line 34 that supplies gas fuel to the main burner nozzles 30 is wound in a coil 36 and is mounted in the frame structure 32 above the main burner nozzles 30. In this way, the heat from the flame expelled by the main burner nozzles 30 can be used to preheat the gas fuel leading to the main burner nozzles 30. The release of gas fuel to the main burner nozzles 30 is controlled by the primary burner control 38, which is manually operated by the pilot in the hot air balloon 12.

The existence of the fuel line coil 36 above the main burner nozzles 30 causes the frame structure 32 to be large and obstruct the visibility of the area surrounding and immediately above the main burner nozzles 30. The illumination burner assembly 20 is an electro-mechanical assembly that attaches to the frame structure 32 surrounding the main burner nozzles 30. The illumination burner assembly 20 contains a small support frame 40. The support frame 40 has protruding arms 42 that engage the frame structure 32 surrounding the main burner nozzles 30. The protruding arms 42 can attach to the frame structure 32 using mechanical fasteners, clamping mechanisms and/or simple hooking configurations.

The support frame 40 supports a secondary burner nozzle 44 and a pilot light conduit 46. The secondary burner nozzle 44 and the tip of the pilot light conduit 46 are aligned, with the pilot light conduit 46 supporting a pilot light flame 47 a short distance above the secondary burner nozzle 44. As the support frame 40 of the illumination burner assembly 20 attaches to the frame structure 32, the secondary burner nozzle 44 extends into the frame structure 32 at a point above the main burner nozzles 30. By positioning the pilot burner conduit 46 high in the frame structure 32, the flame ignited by the pilot light flame 47 projects above the frame structure 32 and is not visually obstructed by the frame structure 32 or the fuel line coil 36. As a result, nearly all of the flame produced by the secondary burner nozzle 44 and ignited by the pilot light flame 47 are visible to a person observing the hot air balloon 12.

The secondary burner nozzle 44 is configured with a narrow nozzle diameter. As such, the secondary burner nozzle 44 emits a narrow stream of gas fuel past the pilot light flame 47. As the narrow stream of gas fuel passes the pilot light conduit 46, the narrow stream of fuel ignites and produces an elongated flame from a relatively small volume of gas fuel. The flame has a small diameter, since the gas supplying the flame is kept in a tight stream by the secondary burner nozzle 44. The supply of gas fuel to the pilot light conduit 46 is controlled by a manual valve 48, wherein the volume consumed by the pilot light flame 47 is negligible.

A solenoid operated control valve 50 is coupled to the fuel line 52 that supplies the secondary burner nozzle 44. The solenoid operated control valve 50 is positioned between the secondary burner nozzle 44 and the fuel tank 16 so as to control the supply of gas fuel flowing to the secondary burner nozzle 44. The solenoid operated control valve 50 is connected to the central controller 22 (FIG. 1) either through a direct wire interconnection or through a receiver that communicates with the central controller using radio or microwave signals.

When the solenoid operated control valve 50 receives a signal from the remote central controller 22 (FIG. 1) to activate, the solenoid operated control valve 50 opens. Once the solenoid operated control valve 50 opens, gas fuel is supplied to the secondary burner nozzle 44. The secondary burner nozzle 44 emits a narrow stream of gas fuel past the pilot light flame 47, thereby igniting the narrow stream of gas fuel. The flame from the burning gas fuel illuminates the interior of the hot air balloon 12 until the solenoid operated control valve 50 is closed and the flow of gas fuel is stopped.

After an illumination exhibition, the illumination burner assembly 20 can be rapidly removed from the frame structure 32 of the primary burner assembly 14 and the hot air balloon 12 is again ready for conventional use.

Referring now to FIG. 3, an alternate embodiment of the present invention system is shown. In this embodiment, no secondary burner assembly is used. Rather, a remotely controlled valve assembly 60 is added to the gas fuel line 34 between the primary burner control 38 and the primary burner nozzles 30. The remotely controlled valve assembly 60 is connected to the central controller 22 (FIG. 1) either by a wire or a radio link. As such, the central controller 22 (FIG. 1) is capable of operating the remotely controlled valve assembly 60 in the same manner as was described in regard to the solenoid valves 50 in the embodiment of FIG. 2.

To operate the system shown in FIG. 3, the manual primary burner control 38 is opened by the pilot in the balloon. The pilot in the balloon then relies upon the operator of the systems controller 22 (FIG. 1) to operate the remotely controlled valve 60. When the remotely controlled valve 60 is opened, gas fuel is fed to the primary burner nozzles 30 and the flames projected by the primary burner nozzles 30 illuminate the balloon.

In the embodiment of FIG. 3, it is assumed that the primary burner control 38 is a manual valve that must be manually operated by the pilot of the balloon. However, if the primary burner control contains an electric solenoid valve, this valve can be directly connected to the systems controller 22 (FIG. 1) by a wire or remote control link. As such, the need for the remotely controlled valve assembly 60 can be eliminated.

It will be understood that the embodiments of the present invention system that are described and illustrated are merely exemplary. Many components of the present invention systems can be replaced with functionally equivalent parts. For example, there are numerous ways to configure the secondary burner assembly so that it attached to the primary burner assembly. A person skilled in the art can therefore make numerous alterations and modifications to the shown embodiment utilizing functionally equivalent components to those shown and described. All such modifications are intended to be included within the scope of the present invention as defined by the appended claims.

What is claimed is:

1. A system for selectively illuminating at least one hot air balloon of the type having a burner assembly that contains a primary burner nozzle, said system comprising:
   a secondary burner nozzle;
   a mount for supporting said secondary burner nozzle in the hot air balloon;
   a fuel control valve coupled to said secondary burner nozzle for controlling fuel flow to said secondary burner nozzle;
   a central controller located at a point remote from said at least one balloon, wherein said central controller controls said fuel control valve.

2. The system according to claim 1, further including a pilot light conduit coupled to said mount, wherein said pilot light conduit supports a pilot flame above said secondary burner nozzle.

3. The system according to claim 1, wherein said central controller is directly coupled to each said fuel control valve with wire.

4. The system according to claim 1, wherein said central controller is coupled to each said fuel control valve with a remote control link.

5. The system according to claim 1, further including a user interface coupled to said central controller for manually instructing said central controller to operate each said fuel control valve.

6. The system according to claim 5, wherein said user interface is selected from a group consisting of a bank of buttons, a bank of switches, an instrument keyboard and a computer keyboard.

7. The system according to claim 1, further including an audio system for playing music, wherein said central controller operates each said fuel control valve in a manner synchronized to the music played through said audio system.

8. The system according to claim 7, wherein said audio system is controlled by said central controller.

9. A method of illuminating a plurality of hot air balloons of the type having a primary burner, said method comprising the steps of:
   providing a plurality of secondary burner assemblies;
   mounting a secondary burner assembly to each of the primary burner assemblies in each hot air balloon; and
   selectively controlling each of said plurality of secondary burner assemblies from a single location.

10. The method according to claim 9, wherein each of said secondary burner assemblies includes a burner nozzle, a fuel supply line leading to said burner nozzle and a control valve in said fuel supply line for controlling the flow of fuel to said burner nozzle.

11. The method according to claim 10, wherein said step of selectively controlling each of said plurality of secondary burner assemblies includes selectively activating said control valve in each of said secondary burner assemblies.

12. The method according to claim 9, wherein said step of selectively controlling each of said plurality of secondary burner assemblies includes the substep of coupling each of said secondary burner assemblies to a common central controller.

13. The method according to claim 12, wherein said substep of coupling each of said secondary burner assemblies to a common central controller includes coupling each of said secondary burner assemblies to a common central controller with wire.

14. The method according to claim 12, wherein said substep of coupling each of said secondary burner assemblies to a common central controller includes coupling each of said secondary burner assemblies to a common central controller with a remote control link.

15. The method according to claim 12, wherein said common central controller is programmed to activate said secondary burner assemblies in a predetermined pattern.

16. The method according to claim 15, wherein said predetermined pattern is choreographed with a selection of music.

17. The method according to claim 12, wherein said common central controller contains a user interface for manually activating said secondary burner assemblies through said central controller.

18. A method of illuminating a plurality of hot air balloons of the type having a burner assembly and a fuel source, said method comprising the steps of:

provinding an electrical valve assembly between the burner assembly and the fuel source on each of the balloons, wherein said electrical valve assembly is capable of controlling fuel flow between the fuel source and the burner assembly;

coupling each electric valve assembly to a common controller that can selectively control each electric valve assembly.

19. The method according to claim 18, wherein said step of coupling each of electric valve assembly to a common central controller includes coupling each said electric valve assembly to a common central controller with a remote control link.

20. The method according to claim 18, wherein said common central controller contains a user interface for manually activating each said electric valve assembly through said central controller.

* * * * *